US012041061B2

(12) United States Patent
Aoki et al.

(10) Patent No.: US 12,041,061 B2
(45) Date of Patent: Jul. 16, 2024

(54) INFORMATION PROCESSING SYSTEM AND INFORMATION PROCESSING METHOD

(71) Applicant: SONY GROUP CORPORATION, Tokyo (JP)

(72) Inventors: Suguru Aoki, Tokyo (JP); Kazuhito Iwasa, Tokyo (JP); Shimizu Itaru, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 283 days.

(21) Appl. No.: 17/600,488

(22) PCT Filed: Apr. 6, 2020

(86) PCT No.: PCT/JP2020/015569
§ 371 (c)(1),
(2) Date: Sep. 30, 2021

(87) PCT Pub. No.: WO2020/209230
PCT Pub. Date: Oct. 15, 2020

(65) Prior Publication Data
US 2022/0191214 A1     Jun. 16, 2022

(30) Foreign Application Priority Data
Apr. 11, 2019   (JP) .................................. 2019-075570

(51) Int. Cl.
*H04L 9/40*       (2022.01)
*G06F 21/62*      (2013.01)

(52) U.S. Cl.
CPC ........ *H04L 63/105* (2013.01); *G06F 21/6245* (2013.01); *H04L 63/101* (2013.01); *H04L 63/20* (2013.01)

(58) Field of Classification Search
CPC ..... H04L 63/105; H04L 63/101; H04L 63/20; G06F 21/6245
(Continued)

(56) References Cited

U.S. PATENT DOCUMENTS

2009/0186629 A1\* 7/2009 Soelberg ............... H04W 4/029
455/456.1
2013/0159192 A1\* 6/2013 Partridge ............... G06Q 30/02
705/14.1

FOREIGN PATENT DOCUMENTS

EP          2605205 A1   6/2013
JP       2006-352803 A   12/2006
(Continued)

OTHER PUBLICATIONS

International Search Report and Written Opinion of PCT Application No. PCT/JP2020/015569, issued on Jun. 30, 2020, 09 pages of ISRWO.

(Continued)

*Primary Examiner* — Michael S McNally
(74) *Attorney, Agent, or Firm* — CHIP LAW GROUP

(57) ABSTRACT

An information processing system includes: a user information accumulation unit that accumulates information regarding a user on a basis of an action of the user; a specifying unit that specifies information corresponding to sensitive information among the accumulated information as corresponding to the sensitive information; and a disclosure control unit that controls a disclosure mode of the information corresponding to the sensitive information in a case where the information corresponding to the sensitive information is disclosed to a third party other than the user.

18 Claims, 9 Drawing Sheets

(58) Field of Classification Search
USPC .............................................................. 726/1
See application file for complete search history.

(56) References Cited

FOREIGN PATENT DOCUMENTS

| | | |
|---|---|---|
| JP | 2009-140051 A | 6/2009 |
| JP | 2009245367 A | 10/2009 |
| JP | 2018200602 A | 12/2018 |

OTHER PUBLICATIONS

Extended European Search Report of EP Application No. 20787977. 6, issued on May 4, 2022, 12 pages.

* cited by examiner

FIG.5

| TYPE | ITEM | SENSITIVITY LEVEL |
|---|---|---|
| PERSONAL INFORMATION | GENDER | 1 |
| | AGE | 1 |
| | RACE | 1 |
| | NATIONALITY | 1 |
| | HOMETOWN | 1 |
| | RESIDENCE | 2 |
| INFORMATION REGARDING ESSENCE OF INDIVIDUAL | LGBT | 4 |
| | HOBBY/PREFERENCE | 3 |
| | GOOD FEELING TOWARD OTHERS | 4 |
| INFORMATION REGARDING STATE OF INDIVIDUAL | HEALTH CONDITION | 3 |
| | PARTNER RELATIONSHIP | 4 |
| | PRESENCE OR ABSENCE OF PREGNANCY | 4 |
| INFORMATION REGARDING POLITICS AND CREED | POLITICAL POSITION | 3 |
| | SUPPORTING PARTY | 3 |
| | RELIGION/DENOMINATION | 3 |
| INFORMATION REGARDING DISCLOSURE OF NEGATIVE INFORMATION | SLANDER ON OTHERS | 4 |
| | DEATH OF RELATIVE | 4 |
| INFORMATION REGARDING ACTION HISTORY | ACTION HISTORY IN REALITY | 3 |
| | ACTION HISTORY ON INTERNET | 3 |
| | AGENT OPERATION HISTORY | 3 |

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2020/015569 filed on Apr. 6, 2020, which claims priority benefit of Japanese Patent Application No. JP 2019-075570 filed in the Japan Patent Office on Apr. 11, 2019. Each of the above-referenced applications is hereby incorporated herein by reference in its entirety.

FIELD

The present disclosure relates to an information processing system, an information processing method, and a program.

BACKGROUND

In recent years, in an information processing apparatus such as a personal computer, a smartphone, or a tablet terminal, a service in which a user enjoys communication with an agent imitating a specific character has become widespread.

In such a service, in a case where close communication is performed over a long period of time between the user and the agent, a trust relationship is established between the user and the agent, and the user may disclose highly confidential information regarding the user to the agent.

Here, in the communication between humans, it is possible to cause the communication partner to grasp the confidentiality of information by using nuances of context or words, or the like. However, under the present circumstances, in communication between the user and the agent, it is difficult for the agent to grasp the nuances of the context or words to the same extent as humans. For this reason, it has been difficult for the agent to grasp the confidentiality of information disclosed by the user, which is indicated implicitly.

Therefore, in a case where the agent individually communicates with a plurality of users, the agent may disclose highly confidential information disclosed by a user to a third party.

As a technology by which a computer or the like determines confidentiality of a conversation content of a user, for example, a technology described in Patent Literature 1 below can be exemplified. Patent Literature 1 discloses a technology of identifying whether or not a call is a call with a high level of confidentiality on the basis of header information of the call, thereby preventing a voice in the call from leaking to the outside on the receiver side.

CITATION LIST

Patent Literature

Patent Literature 1: JP 2006-352803 A

SUMMARY

Technical Problem

However, the technology disclosed in Patent Literature 1 described above is to determine the confidentiality of the call itself on the basis of the header information of the call, and not to determine the confidentiality of each piece of information included in the call or the like. Therefore, in the technology disclosed in Patent Literature 1, information regarding a user is accumulated on the basis of actions of the user, and it is difficult to determine the confidentiality of each piece of information accumulated regarding the user in an agent personalized to the user.

Therefore, there has been a demand for a technology that enables an agent that accumulates information regarding a user on the basis of actions of the user to determine the confidentiality of the accumulated information and appropriately disclose the accumulated information to a third party.

Solution to Problem

According to the present disclosure, an information processing system is provided that includes: a user information accumulation unit that accumulates information regarding a user on a basis of an action of the user; a specifying unit that specifies information corresponding to sensitive information among the accumulated information as corresponding to the sensitive information; and a disclosure control unit that controls a disclosure mode of the information corresponding to the sensitive information in a case where the information corresponding to the sensitive information is disclosed to a third party other than the user.

Moreover, according to the present disclosure, an information processing method performed by an operation processing device is provided that includes: accumulating information regarding a user on a basis of an action of the user; specifying information corresponding to sensitive information among the accumulated information as corresponding to the sensitive information; and controlling a disclosure mode of the information corresponding to the sensitive information in a case where the information corresponding to the sensitive information is disclosed to a third party other than the user.

Furthermore, according to the present disclosure, a program is provided that causes a computer to function as: a user information accumulation unit that accumulates information regarding a user on a basis of an action of the user; a specifying unit that specifies information corresponding to sensitive information among the accumulated information as corresponding to the sensitive information; and a disclosure control unit that controls a disclosure mode of the information corresponding to the sensitive information in a case where the information corresponding to the sensitive information is disclosed to a third party other than the user.

BRIEF DESCRIPTION OF DRAWINGS

FIG. 5 is a table illustrating an example of items set in a sensitive information item database as information corresponding to sensitive information.

DESCRIPTION OF EMBODIMENTS

Figure 1:
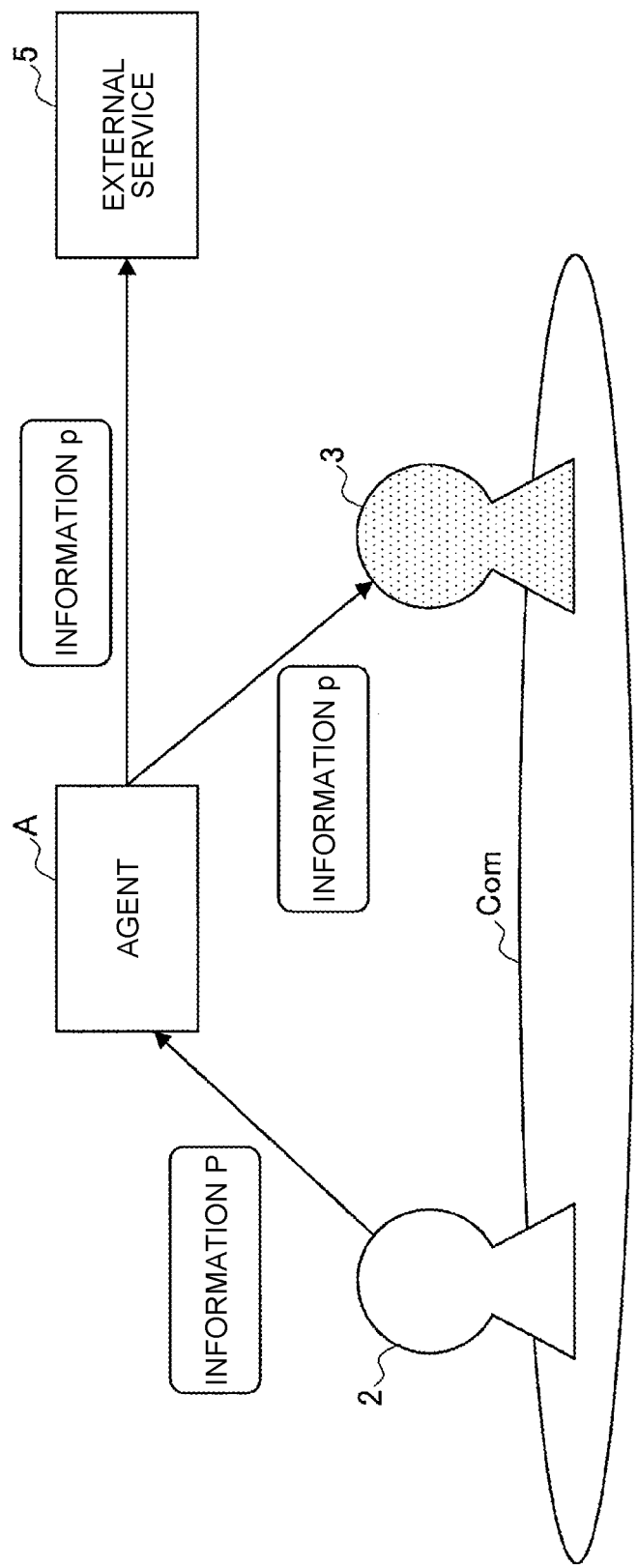
FIG. 1 is a schematic diagram illustrating an application example of a technology according to the present disclosure.

Hereinafter, preferred embodiments of the present disclosure will be described in detail with reference to the accompanying drawings. Note that, in the present specification and the drawings, components having substantially the same functional configuration are denoted by the same reference numerals, and an overlapping description will be omitted.

Note that the description will be provided in the following order.

1. Technical Background of Present Disclosure
1.1. Outline of Technology According to Present Disclosure
1.2. Configuration of Agent
1.3. Outline of Information Processing System
2. Configuration of Information Processing System
3. Operation of Information Processing System
4. Modified Examples of Information Processing System
4.1. First Modified Example
4.2. Second Modified Example
5. Hardware Configuration
6. Supplementary description

1. Technical Background of Present Disclosure

1.1. Outline of Technology According to Present Disclosure

First, an outline of a technology according to the present disclosure will be described with reference to FIG. 1. FIG. 1 is a schematic diagram illustrating an application example of the technology according to the present disclosure.

As illustrated in FIG. 1, the technology according to the present disclosure relates to, for example, an agent A shared by a plurality of users belonging to a predetermined community Com. The predetermined community Com may be, for example, a community including a family, friends, employees of the same company, residents of the same region, or friends having the same hobby.

The agent A is, for example, a software interface that inputs and outputs information P by communicating with a user 2. The user 2 can receive, for example, a support for a daily activity via the agent A. In particular, the agent A can more smoothly communicate with the user 2 by inputting and outputting the information P on a conversation basis or imitating the personality of a specific character.

Specifically, the user 2 can register his/her schedule or action report in a corresponding database via the agent A by telling his/her schedule, action report, or the like to the agent A. In addition, the user 2 requests the agent A for a service such as a work support, performing a work as a proxy, or article purchase, thereby being able to issue a service request to a corresponding external service 5 via the agent A. In this manner, the agent A can accumulate or externally output the information P input from the user 2 by conversation or the like according to the purpose or use.

However, the technology according to the present disclosure is not limited to the above examples. Input/output (that is, interaction) between the user 2 and the agent A may be performed using various input/output means other than a voice. For example, the input from the user 2 to the agent A may be performed using a graphical user interface (GUI), a gesture, a line of sight, or the like. Furthermore, the output from the agent A to the user 2 may be performed using a voice, an image, or a video.

Furthermore, the agent A accumulates information regarding the user 2 on the basis of an input from the user 2 in a conversation or the like. The agent A predicts a personal characteristic or behavior characteristic of the user 2 on the basis of the accumulated information regarding the user 2, such that the agent A can perform a correspondence optimized (that is, personalized) to the user 2 for the user 2.

Here, the agent A can disclose the information p regarding the user 2 to a third party 3 other than the user 2 in order to support communication between users belonging to the community Com.

For example, the agent A can disclose the information p regarding the user 2 to the third party 3 for schedule sharing in the community Com or sharing of an action history (for example, a moving image viewing history or an Internet shopping purchase history) on the Internet. Furthermore, the agent A can disclose the information p regarding the user 2 to the third party 3 in a chat with the third party 3 or disclose the information p regarding the user 2 to the third party 3 as a message or action report from the user 2, for information sharing within the community Com. Moreover, the agent A can disclose the information p regarding the presence/absence or frequency of a request for a work support from the user 2 to the third party 3 in order to facilitate a work within the community Com.

In addition, the agent A can disclose information regarding the user 2 to the external service 5 in order to perform a work as a proxy as indicated by the user 2.

For example, the agent A can disclose the information p regarding the user 2 to the external service 5 in order to manage the schedule of the user 2, suggest and arrange travel, or perform periodical purchase of daily necessities or the like as a proxy. Furthermore, the agent A can disclose the information p regarding the user 2 to the external service 5 in order to cooperate with a service or platform such as a social networking service (SNS).

However, the information regarding the user 2 accumulated by the agent A may include sensitive information having a high level of confidentiality for the user 2. The sensitive information is, for example, information that is sensitive to the user 2. Therefore, the user 2 does not desire to disclose the entire information, and desires to control the content and the range thereof to be disclosed. Specifically, the sensitive information may include information regarding privacy of the user 2, information regarding feelings of the user 2, information regarding a mental and physical condition of the user 2, information regarding an action history of the user 2, and the like. Further, the sensitive information may include information that is not appropriate to be disclosed to the third party 3. Such information that is not appropriate to be disclosed to the third party 3 may include, for example, information regarding evaluation on the third party 3 by the user 2, information regarding a negative utterance, or the like.

The agent A disclosing such sensitive information of the user 2 to the third party 3 without permission of the user 2 may bring a disadvantage to the user 2 and affect a trust relationship between the user 2 and the agent A. Therefore, the agent A that accumulates various information regarding the user 2 on the basis of the actions of the user 2 is required to appropriately handle information corresponding to the sensitive information of the user 2. Specifically, in a case of disclosing information corresponding to the sensitive information of the user 2 to the third party 3, the agent A is required to appropriately control a disclosure mode.

The technology according to the present disclosure has been conceived in view of the above circumstances. An information processing system according to an embodiment of the present disclosure sorts out information corresponding to the sensitive information from the information accumulated in the agent A on the basis of the actions of the user 2, and specifies the information corresponding to the sensitive information. As a result, in a case of disclosing information to the third party 3 other than the user 2, the information processing system according to the embodiment of the present disclosure can appropriately control the disclosure mode of the information on the basis of whether or not the information to be disclosed corresponds to the sensitive information.

Note that the following description is provided under the assumption that the third party 3 includes both a user other than the user 2, who uses the agent A, and the external service 5 that receives some requests from the agent A.

1.2. Configuration of Agent

Figure 2:
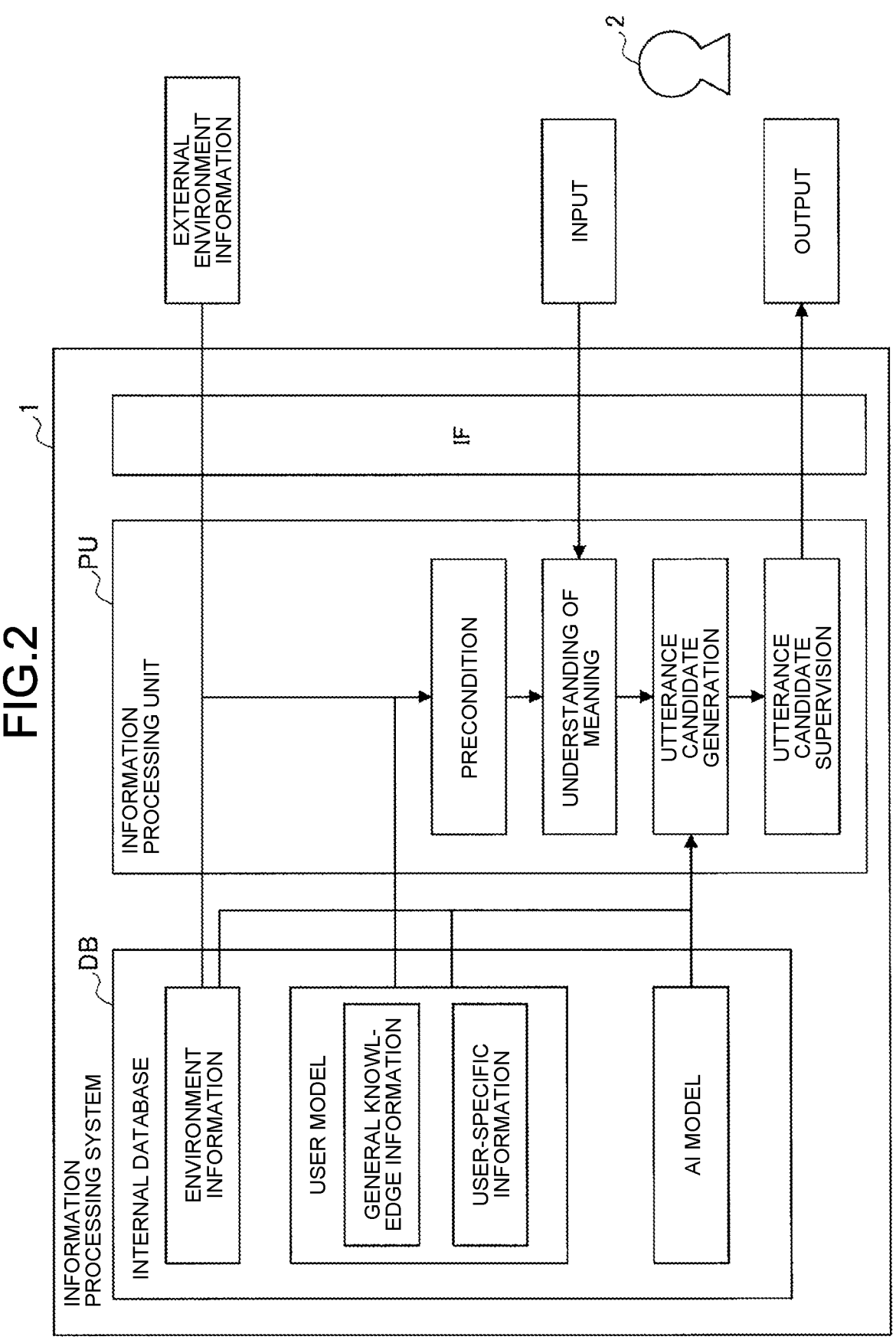
FIG. 2 is a block diagram illustrating a configuration for implementing a basic conversation function between an agent and a user.

Next, the agent A provided in an information processing system 1 according to the present embodiment will be described in detail with reference to FIG. 2. FIG. 2 is a block diagram illustrating a configuration for implementing a basic conversation function between the agent A and the user 2.

As illustrated in FIG. 2, the information processing system 1 according to the present embodiment includes an internal database DB, an information processing unit PU, and an interface IF.

The interface IF inputs and outputs various types of information to and from the user 2 or an external environment. Specifically, the interface IF can acquire information on the external environment where the user 2 is present by using various sensors and input the acquired environment information to the information processing system 1. The environment information acquired by various sensors may be information regarding the position of a place where the user 2 is present, information regarding the time in the place where the user 2 is present, information on the place where the user 2 is present, such as weather, temperature, humidity, and illuminance, information regarding an action currently performed by the user 2, information regarding an event in which the user 2 is interested, and the like.

Furthermore, the interface IF can acquire utterance information of the user 2 by using a microphone or the like, and input the acquired utterance information to the information processing system 1. Furthermore, the interface IF can output voice information generated by the information processing system 1 to the user 2 by using a speaker, a headphone, or the like. As a result, the user 2 can have a voice conversation with the agent A provided in the information processing system 1 via the interface IF.

However, in a case where input/output between the user 2 and the agent A is performed by using a means other than a voice, it goes without saying that the interface IF may include an input/output device other than a voice input/output device such as a microphone, a speaker, or a headphone.

For example, in a case where the input from the user 2 to the agent A is performed by using the GUI, the interface IF may acquire information input from the user 2 by using an input means such as a mouse, a keyboard, a touch panel, a button, a switch, or a lever. In a case where the input from the user 2 to the agent A is performed by using a gesture, the interface IF may acquire information input from the user 2 by using the gesture, by using an acceleration sensor or a gyro sensor provided in a wearable terminal worn on the body of the user 2, an imaging device, or the like. In a case where the input from the user 2 to the agent A is performed by using a line of sight, the interface IF may acquire information input from the user 2 by using the line of sight, by using an imaging device or the like that detects the line of sight of the user 2.

On the other hand, in a case where the output from the agent A to the user 2 is performed by using an image or a video, the interface IF may present the image or the video to the user 2 by using a display device such as a cathode ray tube (CRT) display device, a liquid crystal display device, a plasma display device, an electro luminescence (EL) display device, a laser projector, a light emitting diode (LED) projector, or a lamp.

The internal database DB is a storage unit that stores various types of information. The internal database DB may store, for example, the environment information of the place where the user 2 is present acquired via the interface IF. Furthermore, the internal database DB may store a user model in which information regarding the user 2 is accumulated. Moreover, the internal database DB may store an AI model that defines a personality unique to the agent A.

The user model is used to optimize the correspondence of the agent A with respect to the user 2. The user model may include, for example, attribute information of the user 2, information regarding an action history of the user 2, information regarding the state of the user 2 estimated from these pieces of information, and the like. The attribute information of the user 2 may include, for example, information regarding the gender, age, race, nationality, hometown, residence, occupation, history (for example, educational background and work history), family member, qualification, or the like of the user 2. Furthermore, the information regarding the action history of the user 2 may include information regarding a position history of the user 2, an Internet operation history, a history of utterances to the agent A or the third party 3, or a history of operation of the agent A. Furthermore, the information regarding the estimated state of the user 2 may include information regarding the political creed, health condition, mental condition, or asset state of the user 2.

Note that the user model may have the information regarding the user 2 divided into general user information and user-specific information. The general user information is, for example, information of a standard or average virtual user assumed by a service provider providing the information processing system 1. On the other hand, the user-specific information is information specific to the user 2, and is information accumulated for each user on the basis of the actions of the user 2. With such a configuration, the information processing system 1 only needs to store a difference from the general user information as the user-specific information for each user 2 by sharing a part of the user model among the users as the general user information, such that the occupied storage capacity of the internal database DB can be reduced.

The AI model includes information defining the personality unique to the agent A. The AI model may include, for example, information regarding character setting of the agent A, information regarding a personality characteristic of the agent A, or information regarding an utterance mode (words to be used, speaking habits, or the like) of the agent A. The utterance content of the agent A is determined on the basis of various types of information included in the AI model. Note that the AI model does not have to be stored in the internal database DB. However, in a case where the AI model is stored in the internal database DB, the personality of the agent A can be presented to the user 2, such that the information processing system 1 can expect promotion of communication between the user 2 and the agent A.

The information processing unit PU controls an output from the agent A in response to an input from the user 2. Specifically, the information processing unit PU controls the output from the agent A with respect to the input from the user 2 by processes such as precondition generation, understanding of meaning, and utterance candidate generation.

First, the information processing unit PU generates a precondition for the agent A to make an utterance. Specifically, the information processing unit PU generates a condition (that is, a context or the like) that is a premise of the utterance of the agent A by using the information on the external environment acquired via the interface IF, the environment information stored in the internal database DB, and the user model.

Next, the information processing unit PU understands the meaning of the utterance content of the user 2 on the basis of the precondition, and generates meaning information on the basis of the understanding result. Specifically, the information processing unit PU understands the meaning of each word included in the utterance of the user 2 on the basis of the precondition, and integrates these meanings to generate the meaning information indicating the meaning of the utterance content of the user 2.

Subsequently, the information processing unit PU generates an utterance candidate of the agent A on the basis of the generated meaning information and the environment information stored in the internal database DB, the user model, and the AI model. Specifically, the information processing unit PU grasps an intent or request included in the utterance of the user 2 on the basis of the generated meaning information, the environment information, and the user model, and generates a candidate for the utterance content of the agent A corresponding to the utterance of the user 2 on the basis of the AI model.

Note that the information processing unit PU may supervise the generated candidate for the utterance content of the agent A. For example, the information processing unit PU may determine whether or not a word (for example, a negative expression, a socially inappropriate expression, or the like) that is not preferable to be uttered by the agent A is included in the generated candidate for the utterance content, and control the utterance content so as not to include an unpreferable word. Furthermore, in a case where the agent A has a predetermined personality based on the AI model, the information processing unit PU may determine whether or not an expression that does not match the personality of the agent A is included in the generated candidate for the utterance content, and control the utterance content so as not to include an expression that does not match the personality.

Thereafter, the information processing system 1 determines an utterance content from utterance content candidates, and outputs the determined utterance content from the agent A to the user 2 via the interface IF.

With the above configuration, in the information processing system 1 according to the present embodiment, the provided agent A can output a natural response to the utterance from the user 2.

1.3. Outline of Information Processing System

Figure 3:
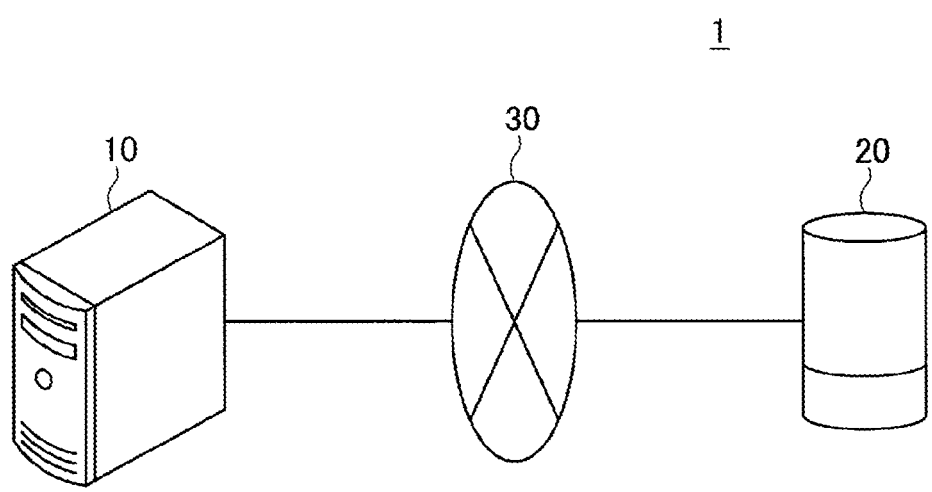
FIG. 3 is a schematic diagram illustrating an example of an apparatus included in an information processing system according to an embodiment of the present disclosure.

Next, an apparatus included in the information processing system according to the present embodiment will be described in detail with reference to FIG. 3. FIG. 3 is a schematic diagram illustrating an example of the apparatus included in the information processing system according to the present embodiment.

As illustrated in FIG. 3, the information processing system 1 may include, for example, an information processing apparatus 10 and a user terminal 20. The information processing apparatus 10 and the user terminal 20 can be connected to each other via a network 30 in a wired or wireless manner.

The information processing apparatus 10 generates, for example, an utterance content uttered by the agent A. The information processing apparatus 10 may output information regarding the generated utterance content to the user terminal 20 connected via the network 30.

The user terminal 20 outputs, for example, a voice signal generated on the basis of the information regarding the utterance content input from the information processing apparatus 10 via the network 30, to the user 2 as a voice.

The user terminal 20 may be a so-called smart speaker as illustrated in FIG. 3, but is not limited to such an example. The user terminal 20 may be, for example, a mobile phone, a tablet terminal, a personal computer (PC), a game machine, a wearable terminal (smart eyeglass, smart band, smart watch, smart neck, or the like), or a robot imitating a human, various animals, various characters, or the like.

2. Configuration of Information Processing System

Figure 4:
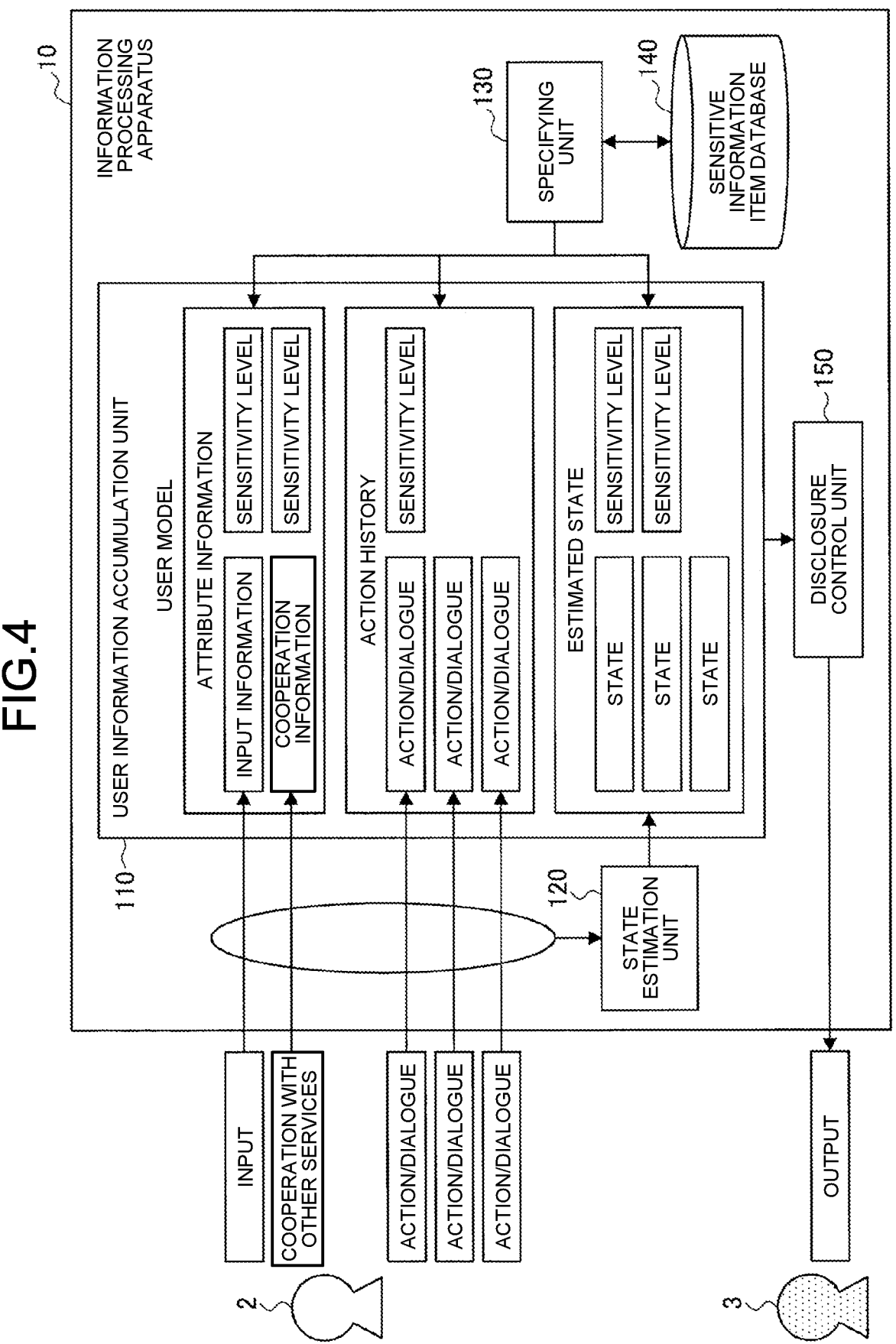
FIG. 4 is a block diagram illustrating a configuration for implementing the technology according to the present disclosure in the information processing system according to the embodiment.

Next, a configuration for implementing the technology according to the present disclosure in the information processing system 1 according to the present embodiment will be described with reference to FIG. 4. FIG. 4 is a block diagram illustrating the configuration for implementing the technology according to the present disclosure in the information processing system 1 according to the present embodiment.

As illustrated in FIG. 4, the information processing apparatus 10 included in the information processing system 1 includes a user information accumulation unit 110, a state estimation unit 120, a specifying unit 130, a sensitive information item database 140, and a disclosure control unit 150. However, it goes without saying that some or all of these functions included in the information processing apparatus 10 may be included in the user terminal 20.

The user information accumulation unit 110 accumulates the information regarding the user 2 to construct a user model of the user 2.

Specifically, the user information accumulation unit 110 may accumulate the attribute information of the user 2 on the basis of an information input from the user 2 or an information input from another cooperative external service. The attribute information of the user 2 is constant (that is, it does not change or does not change for a certain period of time) information belonging to the user 2. For example, the attribute information of the user 2 may be information regarding the gender, age, race, nationality, hometown, residence, occupation, history (for example, educational background and work history), family member, qualification, or the like of the user 2.

Furthermore, the user information accumulation unit 110 may accumulate information regarding the action history of the user 2 on the basis of a dialogue or action of the user 2. The information regarding the action history of the user 2 is information regarding a history of the dialogue or action of the user 2 that can be acquired by the agent A. For example, the information regarding the action history of the user 2 may be information regarding a history of position information indicating movement of the user 2, a web page browsing or input history of the user 2, an online shop purchase history of the user 2, an online bank transaction history or the like of the user 2, an external service use history of the user 2, a history of an utterance content and used words of the user 2 with respect to the agent A or the third party 3, a history of operation of the agent A by the user 2, or the like.

Furthermore, the user information accumulation unit 110 may accumulate information regarding the state of the user 2 estimated by the state estimation unit 120. The information regarding the state of the user 2 is information regarding the state of the user 2 estimated by the state estimation unit 120 to be described later on the basis of the information acquired by the agent A. For example, the information regarding the state of the user 2 may be information regarding the political creed or the like of the user 2, information regarding evaluation on others by the user 2, information regarding the health condition of the user 2, information regarding the asset state of the user 2, information regarding the personality characteristic of the user 2, information regarding a behavior tendency model of the user 2, information regarding the mental condition of the user 2, or the like.

Note that the information regarding the user 2 accumulated by the user information accumulation unit 110 is not limited to the above example. The user information accumulation unit 110 may accumulate any information as long as it is the information regarding the user 2 and is permitted by the user 2.

The state estimation unit 120 estimates the state of the user 2 on the basis of information input by the user 2, information input by the user 2 in another external service, or information regarding the dialogue or action of the user 2. The information regarding the state of the user 2 estimated by the state estimation unit 120 is accumulated in the user information accumulation unit 110. For example, the state estimation unit 120 may estimate the political creed of the user 2, the presence or absence of pregnancy of the user 2, the evaluation on others by the user 2, the good or bad emotion of the user 2 toward others, the health condition of the user 2, the asset state of the user 2, the mental condition of the user 2, or the like on the basis of the information input by the user 2, the information input by the user 2 in another external service, or the information regarding the dialogue or action of the user 2. The health condition of the user 2 may include, for example, estimation that the user 2 is pregnant or estimation that the user 2 is injured. The information regarding the health condition of the user 2 may correspond to the sensitive information for some users 2. The estimation of the state of the user 2 performed by the state estimation unit 120 may be performed on the basis of, for example, a machine learning algorithm or may be performed on the basis of a predetermined rule.

Furthermore, the state estimation unit 120 may label the information regarding the estimated state of the user 2 as estimation information. This is because there is a possibility that the state of the user 2 estimated by the state estimation unit 120 is not accurate. By labeling the information regarding the state of the user 2 as the estimation information, the information processing apparatus 10 can distinguish the information from accurate information input by the user 2 himself/herself. In addition, the information processing apparatus 10 can consider the fact that the information is the estimated information when disclosing the information to the third party 3 or making determination based on the information. For example, the information processing apparatus 10 may control the disclosure mode so that the information regarding the state of the user 2, which is the estimation information, is not disclosed to the third party 3.

Furthermore, the state estimation unit 120 may add information regarding accuracy (certainty) of estimation to the information labeled as the estimation information. By doing so, the information processing apparatus 10 can control the disclosure mode so that only more accurate estimation information is disclosed to the third party 3.

The specifying unit 130 specifies information corresponding to the sensitive information among the information accumulated in the user information accumulation unit 110 as corresponding to the sensitive information. Specifically, the specifying unit 130 may specify, as corresponding to the sensitive information, information corresponding to an item set in the sensitive information item database 140 among the information accumulated in the user information accumulation unit 110. Furthermore, the specifying unit 130 may set a sensitivity level indicating the level of sensitivity of the sensitive information for each piece of information corresponding to the sensitive information.

The sensitive information is, for example, information that is highly confidential for the user 2 and sensitive to disclosure to the third party 3. Therefore, the user 2 may request to limit the range of the third party 3 to which the sensitive information is disclosed. The sensitivity level is the level of confidentiality and the level of sensitivity of information corresponding to the sensitive information, and is set to control the disclosure mode of the information corresponding to the sensitive information in stages. An item of information corresponding to the sensitive information and the sensitivity level of the item may be set in advance in the sensitive information item database 140, for example.

For example, in the sensitive information item database 140, various items illustrated in FIG. 5 may be set as items of information corresponding to the sensitive information. FIG. 5 is a table illustrating an example of items set in the sensitive information item database 140 as information corresponding to the sensitive information. Note that the sensitive information item database 140 may be stored in, for example, a storage device such as a hard disk drive (HDD) included in the information processing apparatus 10, may be stored in a storage device included in the user terminal 20, or may be stored in a storage device of another server connected to the information processing apparatus 10.

As illustrated in FIG. 5, in the sensitive information item database 140, items for personal information of the user 2 such as the gender, age, race, nationality, hometown, or residence may be set as the items of the information corresponding to the sensitive information. Furthermore, in the sensitive information item database 140, items for information regarding the essence of the user 2 such as LGBT, hobby/preference, and a good feeling toward others may be set as the items of the information corresponding to the sensitive information. Furthermore, in the sensitive information item database 140, items for information regarding the state of the user 2 such as the health condition, partner relationship, and presence or absence of pregnancy may be set as the items of the information corresponding to the sensitive information. Furthermore, in the sensitive information item database 140, items for information negative for the user 2, such as a slander on others and a death of a relative, may be set as the items of the information corresponding to the sensitive information. Furthermore, in the sensitive information item database 140, items for information regarding the action history of the user 2 such as an action history in reality and on the Internet, and an agent operation history may be set as the items of the information corresponding to the sensitive information.

As illustrated in FIG. 5, the sensitivity level may be set for each of the items of the information corresponding to the sensitive information in the sensitive information item database 140. Note that, in the example illustrated in FIG. 5, the sensitivity level is set in such a manner that the greater the number, the higher the level of confidentiality or sensitivity.

For example, a lower sensitivity level may be set for items of information that can be easily known by the third party 3 having some kind of connection with the user 2, such as personal information such as the gender, age, race, nationality, hometown, and residence. Furthermore, a higher sensitivity level may be set for items of information regarding the inside of an individual, such as LGBT, a good feeling toward others, and a partner relationship. Moreover, a higher sensitivity level may be set for items of negative information such as a slander on others and a death of a relative.

Note that the information items set in the sensitive information item database 140 may be changed on the basis of the characteristics of the user 2. Specifically, the information items set in the sensitive information item database 140 may be changed for each user 2 according to a value model based on a cultural or social background (for example, the country in which the user 2 was raised, the age group to which the user 2 belongs, or the religion in which the user 2 believes) of the user 2. This is because it is considered that the sensitivity of the user 2 to various types of information or the resistance to disclosure varies depending on the cultural or social value model of the user 2. For example, in a case where the user 2 believes in a specific religion or belongs to a specific age group, an item of the information corresponding to the sensitive information may be further added to the sensitive information item database 140.

With the above configuration, the specifying unit 130 can sort out the information corresponding to the sensitive information from the information accumulated in the user information accumulation unit 110 on the basis of the items set in the sensitive information item database 140. In addition, the specifying unit 130 specifies the sorted-out information corresponding to the sensitive information as corresponding to the sensitive information, such that the disclosure control unit 150 in the subsequent stage can control the disclosure mode of the information corresponding to the sensitive information.

The disclosure control unit 150 controls the mode of the disclosure of the information corresponding to the sensitive information to the third party 3 other than the user 2. Specifically, the disclosure control unit 150 does not have to disclose the information corresponding to the sensitive information to the third party 3 other than the user 2. Alternatively, the disclosure control unit 150 may disclose only an outline of the information to the third party 3 other than the user 2, or may disclose only a part of the information.

Furthermore, the disclosure control unit 150 may control the mode of the disclosure of the information to the third party 3 other than the user 2 in stages according to the sensitivity level set for the information corresponding to the sensitive information. Specifically, the disclosure control unit 150 may control whether or not to disclose the information to the third party 3 according to the sensitivity level set for the information corresponding to the sensitive information. For example, the disclosure control unit 150 may control the disclosure range of the information in stages in such a manner that the higher the sensitivity level of the information corresponding to the sensitive information, the narrower the range of the third party 3 to which the information is to be disclosed.

Furthermore, the disclosure control unit 150 may control the mode of the disclosure of the information to the third party 3 other than the user 2 in stages on the basis of a relationship between the user 2 and the third party 3. Specifically, the disclosure control unit 150 may control whether or not to disclose the information corresponding to the sensitive information to the third party 3 on the basis of at least one of the presence or absence of acquaintance, the degree of familiarity, or the degree of relatedness between the user 2 and the third party 3.

For example, the disclosure control unit 150 may disclose information having a sensitivity level equal to or lower than a threshold only to a third party 3 who has an acquaintance with the user 2. Furthermore, the disclosure control unit 150 may disclose information having a sensitivity level equal to or higher than the threshold only to a third party 3 having a somewhat high degree of familiarity or a somewhat high degree of relatedness.

Furthermore, the disclosure control unit 150 may control the mode of the disclosure of the information to the third party 3 on the basis of a difference in community between the user 2 and the third party 3, may control the mode of the disclosure of the information to the third party 3 on the basis of the closeness of a relationship such as a wedded pair, a family, colleagues, or friends in the community to which the user 2 and the third party 3 belong, or may control the mode of the disclosure of the information to the third party 3 on the basis of a vertical relationship in the community to which the user 2 and the third party 3 belong.

Here, the presence of acquaintance between the user 2 and the third party 3 may only mean that the user 2 and the third party 3 have actually met in the real world. Alternatively, the presence of acquaintance between the user 2 and the third party 3 may mean not only that the user 2 and the third party 3 have actually met in the real world, but also that there is a connection on the Internet or an SNS.

The relationship between the user 2 and the third party 3 may be determined on the basis of, for example, the attribute information of the user 2 and the third party 3. Furthermore, the relationship between the user 2 and the third party 3 may be determined on the basis of, for example, a setting made through an input of the user 2. Alternatively, the relationship between the user 2 and the third party 3 may be determined by referring to information in the external service 5 or the SNS. Furthermore, the relationship between the user 2 and the third party 3 may be determined on the basis of the content of the utterance of the user 2 or the dialogue between the user 2 and the third party 3. The disclosure control unit 150 can determine the relationship between the user 2 and the third party 3 by using various methods.

As a result, the disclosure control unit 150 can control the disclosure mode for the information corresponding to the sensitive information as exemplified below.

For example, the disclosure control unit 150 may disclose the personal information of the user 2 such as the gender, age, race, nationality, hometown, and residence to the third party 3 only with the permission of the user 2. Accordingly, the disclosure control unit 150 can control the disclosure mode of the information in such a manner that the personal information of the user 2 is automatically input only in a service or a web page permitted by the user 2.

Furthermore, the disclosure control unit 150 may control the disclosure mode of the information in such a manner that the personal information of the user 2 such as the gender, age, race, nationality, hometown, and residence is not disclosed to a third party 3 (including any of another user and the external service) who does not have an acquaintance with the user 2 without the permission of the user 2. By doing so, the disclosure control unit 150 can control the disclosure mode of the information in such a manner that the personal information of the user 2 is disclosed only to a user who is a friend of the user 2 on the SNS, and the personal information of the user 2 is not disclosed to other users.

Furthermore, the disclosure control unit 150 may control the disclosure mode of the information in such a manner that information regarding a recommendation or proposal generated for the user 2 is not disclosed to the user 2 in a state where the information can be browsed by the third party 3. By doing so, the disclosure control unit 150 can control the disclosure mode of the information in such a manner that information provided based on the information corresponding to the sensitive information, for example, a recommendation of a baby product for a pregnant woman, a plan proposal for a trip with a partner, a help proposal for illness, or the like, is not disclosed in an environment (public place, office environment, or the like) in which the third party 3 other than the user 2 can disclose such information. Furthermore, in a place where the third party 3 is present (for example, a shared space of a share house or the like), the disclosure control unit 150 can control the disclosure mode of the information in such a manner that information determined on the basis of the information corresponding to the sensitive information of the user 2, or information suggesting the information corresponding to the sensitive information of the user 2 is not present to the user 2. By doing so, in a case where the user 2 discloses the information corresponding to the sensitive information to the agent A or the information corresponding to the sensitive information is estimated by the agent A on the basis of the action of the user 2, the disclosure control unit 150 can perform a control in such a manner that the information is not disclosed from the agent A to the third party 3. Therefore, the user 2 can use the agent A with a sense of security without concern that the information will be disclosed to the third party 3 and the user 2 will suffer a disadvantage.

Furthermore, in a case of supporting communication between the user 2 and the third party 3, the disclosure control unit 150 can appropriately control a form of information to be disclosed to the user 2 or the third party 3. As a result, the disclosure control unit 150 can perform matching between the user 2 and the third party 3 in consideration of information regarding the good or bad emotion of the user 2, and control the disclosure mode of the information in such a manner that the information regarding the good or bad emotion of the user 2 is not disclosed to the third party 3.

In the information processing system 1 including the information processing apparatus 10 having the above configuration, the agent A that has accumulated the information regarding the user 2 can appropriately control the disclosure of the information corresponding to the sensitive information of the user 2 to the third party 3. Therefore, the information processing system 1 can more appropriately handle the information accumulated on the basis of the actions of the user 2.

3. Operation of Information Processing System

Figure 6:
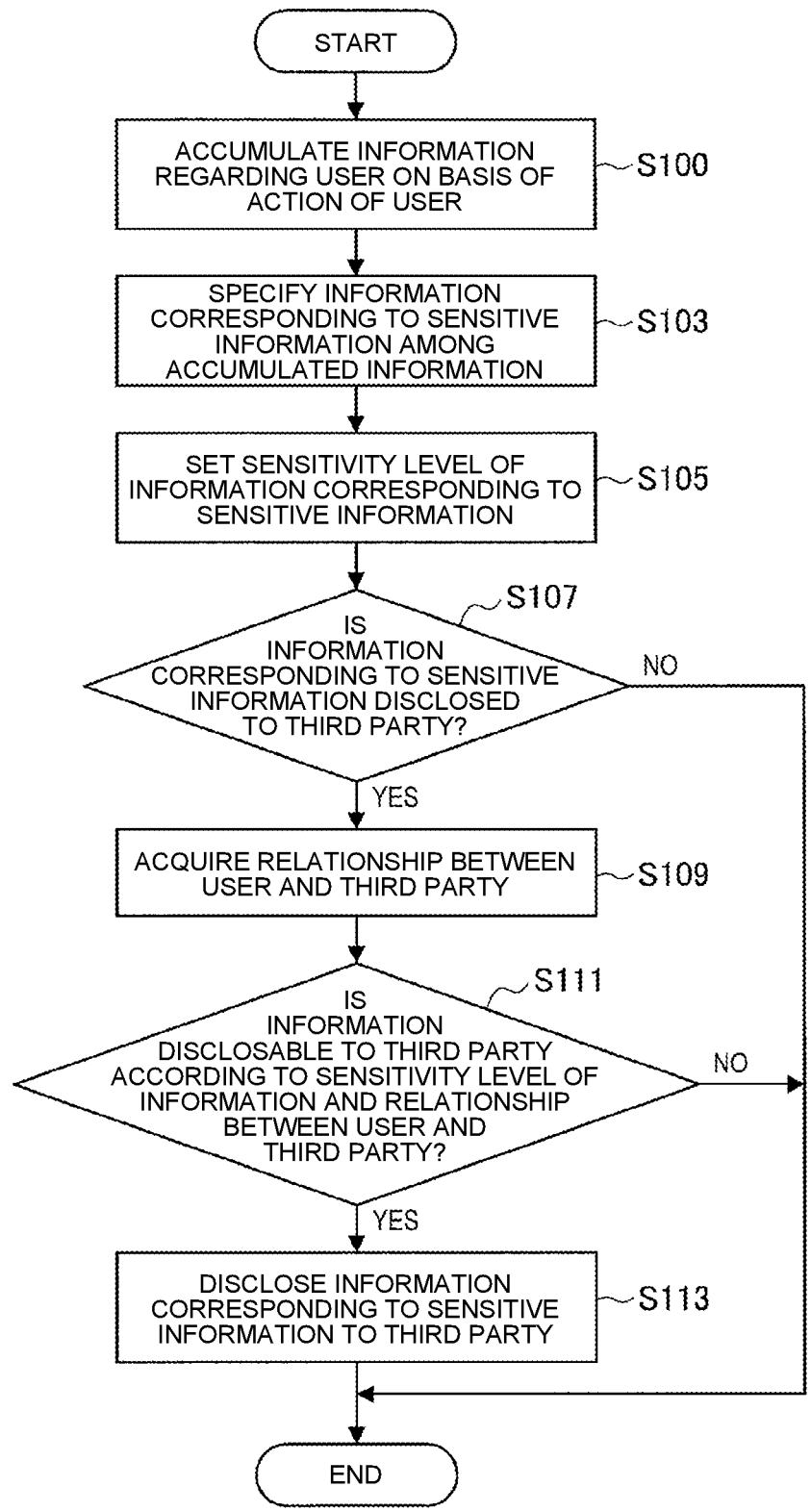
FIG. 6 is a flowchart illustrating an operation example of the information processing system according to the embodiment.

Next, an operation of the information processing system 1 according to the present embodiment will be described with reference to FIG. 6. FIG. 6 is a flowchart illustrating an operation example of the information processing system 1 according to the present embodiment.

The operation example of the information processing system 1 described below is an operation example of controlling whether or not to disclose the information corresponding to the sensitive information among the information regarding the user 2 on the basis of the sensitivity level set for the information and the relationship between the user 2 and the third party 3.

As illustrated in FIG. 6, first, the information processing system 1 configuring the agent A accumulates the information regarding the user 2 on the basis of the actions of the user 2 (S101). For example, the information processing system 1 may accumulate the information regarding the user 2 in the user information accumulation unit 110 on the basis of the dialogue or the like between the agent A and the user 2.

Then, the information processing system 1 sorts out information corresponding to the sensitive information among the accumulated information, and specifies the sorted-out information as corresponding to the sensitive information (S103). For example, the specifying unit 130 of the information processing system 1 may specify, as corresponding to the sensitive information, information corresponding to an item set in the sensitive information item database 140 among the information accumulated in the user information accumulation unit 110.

Next, the information processing system 1 sets the sensitivity level of the information corresponding to the sensitive information (S105). For example, the specifying unit 130 of the information processing system 1 may set the sensitivity level of the information specified as corresponding to the sensitive information on the basis of the item of the information set in the sensitive information item database 140.

Then, the information processing system 1 determines whether or not it is a situation where the information specified as corresponding to the sensitive information is to be disclosed to the third party 3 (S107). For example, the disclosure control unit 150 of the information processing system 1 may determine whether or not it is a situation where the information of the user 2 specified as corresponding to the sensitive information is to be disclosed to the third party 3 on the basis of a content of conversation between the agent A and the third party 3.

In a case where it is determined that it is not a situation where the information corresponding to the sensitive information of the user 2 is to be disclosed to the third party 3 (S107/No), the information processing system 1 does not disclose the information corresponding to the sensitive information to the third party 3. On the other hand, in a case where it is determined that it is a situation where the information corresponding to the sensitive information of the user 2 is to be disclosed to the third party 3 (S107/Yes), the information processing system 1 acquires a relationship between the user 2 and the third party 3 (S109). For example, the information processing system 1 may specify the user 2 and the third party 3 by voice recognition or image recognition, and then specify the relationship between the user 2 and the third party 3 on the basis of the information accumulated in the user information accumulation unit 110. Alternatively, the information processing system 1 may specify the relationship between the user 2 and the third party 3 by specifying the user 2 and the third party 3 on the basis of the user information registered in the external service 5.

Thereafter, the information processing system 1 determines whether or not the information corresponding to the sensitive information is disclosable to the third party 3 on the basis of the sensitivity level of the information corresponding to the sensitive information and the relationship between the user 2 and the third party 3 (S111). For example, in a case where the sensitivity level of the information to be disclosed exceeds a threshold of the sensitivity level of information that is disclosable on the basis of the relationship between the user 2 and the third party 3, the disclosure control unit 150 of the information processing system 1 may determine that the information is disclosable to the third party 3.

In a case where it is determined that the information corresponding to the sensitive information is disclosable to the third party 3 (S111/Yes), the information processing system 1 discloses the information corresponding to the sensitive information to the third party 3 (S113). On the other hand, in a case where it is determined that the information corresponding to the sensitive information is not disclosable to the third party 3 (S111/No), the information processing system 1 does not disclose the information corresponding to the sensitive information to the third party 3.

With the above operation, the information processing system 1 can control whether or not to disclose the information corresponding to the sensitive information among the information regarding the user 2 on the basis of the sensitivity level set for the information and the relationship between the user 2 and the third party 3.

4. Modified Examples of Information Processing System

4.1. First Modified Example

Figure 7:
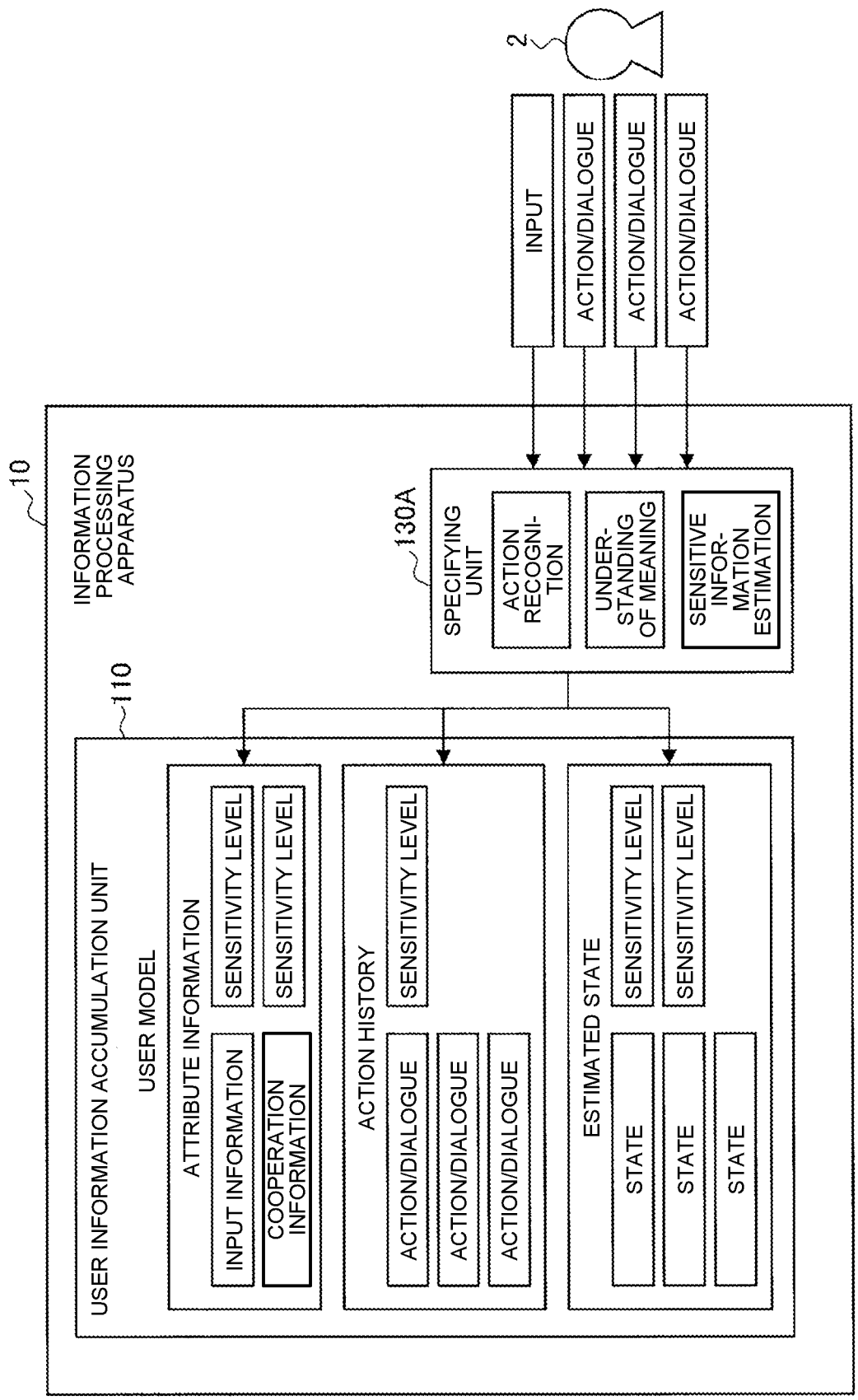
FIG. 7 is a block diagram illustrating a part extracted from functions of the information processing apparatus included in the information processing system according to a first modified example.

Next, a first modified example of the information processing system 1 according to the present embodiment will be described with reference to FIG. 7. FIG. 7 is a block diagram illustrating a part extracted from the functions of the information processing apparatus 10 included in the information processing system 1 according to the first modified example.

As illustrated in FIG. 7, in the first modified example, a specifying unit 130A specifies the information regarding the user 2 as corresponding to the sensitive information on the basis of a form of the action of the user 2. That is, the specifying unit 130A can individually specify not only the information corresponding to the item set in advance in the sensitive information item database 140 but also information estimated to have a high level of confidentiality from the action or utterance of the user 2, as corresponding to the sensitive information. Note that the configuration other than the specifying unit 130A is as described with reference to FIG. 4, and thus the description thereof is omitted here.

Specifically, the specifying unit 130A may estimate whether or not the information acquired on the basis of the action or utterance of the user 2 corresponds to the sensitive information, on the basis of action recognition for the action performed by the user 2 or understanding of meaning of an utterance content uttered by the user 2.

The specifying unit 130A may specify, on the basis of a form or biological information of the user 2 at the time of information disclosure, information acquired through the information disclosure as corresponding to the sensitive information. In such a case, the specifying unit 130A can estimate whether or not the user 2 is sensitive to information disclosure on the basis of the form, biological information, or the like of the user 2, and specify the information disclosed by the user 2 as corresponding to the sensitive information. For example, in a case where it is estimated that the user 2 is nervous on the basis of the tone of the voice or the biological information of the user 2, or in a case where it is estimated that the user 2 wants to keep the information disclosed by the user 2 secret from the volume of the voice of the user 2, the specifying unit 130A may specify the disclosed information as corresponding to the sensitive information.

The specifying unit 130A may specify information included in the utterance content of the user 2 as corresponding to the sensitive information on the basis of the understanding of the meaning of the utterance content of the user 2. In such a case, the specifying unit 130A understands the meaning of the utterance content of the user 2, and estimates whether or not the user 2 wants to keep the information disclosed by the user 2 secret, such that it is possible to specify the information disclosed in the utterance from the user 2 as corresponding to the sensitive information. For example, in a case where the user 2 discloses information in an utterance including a specific word indicating the level of confidentiality or sensitivity of information, such as "I want this to be kept secret" or "I want you not to tell anybody", the specifying unit 130A may specify the disclosed information as corresponding to the sensitive information.

In addition, the specifying unit 130A may specify the information acquired through the information disclosure as corresponding to the sensitive information on the basis of a mode of the information disclosure of the user 2. Specifically, the specifying unit 130A may specify the information acquired through the information disclosure as corresponding to the sensitive information on the basis of the bias of the third party 3 to which the user 2 discloses the information. In such a case, since the user 2 does not intend to disclose the information to all the third parties 3, the specifying unit 130A can estimate that the information corresponds to the sensitive information and specify the information as corresponding to the sensitive information. For example, in a case where the user 2 discloses certain information only to a woman, the specifying unit 130A may specify the information as corresponding to the sensitive information.

Furthermore, the specifying unit 130A may determine whether or not the information regarding the user 2 is information corresponding to the sensitive information by using a feature amount space. Specifically, the specifying unit 130A may determine whether or not the disclosed information corresponds to the sensitive information by inputting a vector representing an action of the user 2 at the time of the information disclosure to the feature amount space.

The feature amount space is a technology used when a classifier using a machine learning algorithm is constructed. In the feature amount space, the vector representing the action of the user 2 at the time of the information disclosure is plotted, and a boundary line for determining whether or not the disclosed information corresponds to the sensitive information is drawn by machine learning. Therefore, the specifying unit 130A can estimate whether or not the information disclosed by the user 2 corresponds to the sensitive information on the basis of a region of the feature amount space in which the vector representing the action of the user 2 at the time of the information disclosure is plotted. As a result, the specifying unit 130A can estimate whether or not the information disclosed by the user 2 corresponds to the sensitive information by machine learning.

Note that, in a case where the information processing apparatus 10 constructs a large number of user models, the specifying unit 130A may determine that information estimated to correspond to the sensitive information in a plurality of user models is generally information corresponding to the sensitive information. In such a case, the specifying unit 130A additionally sets an item of the information in the sensitive information item database 140, such that even another user 2 can automatically determine the information as information corresponding to the sensitive information.

4.2. Second Modified Example

Figure 8:
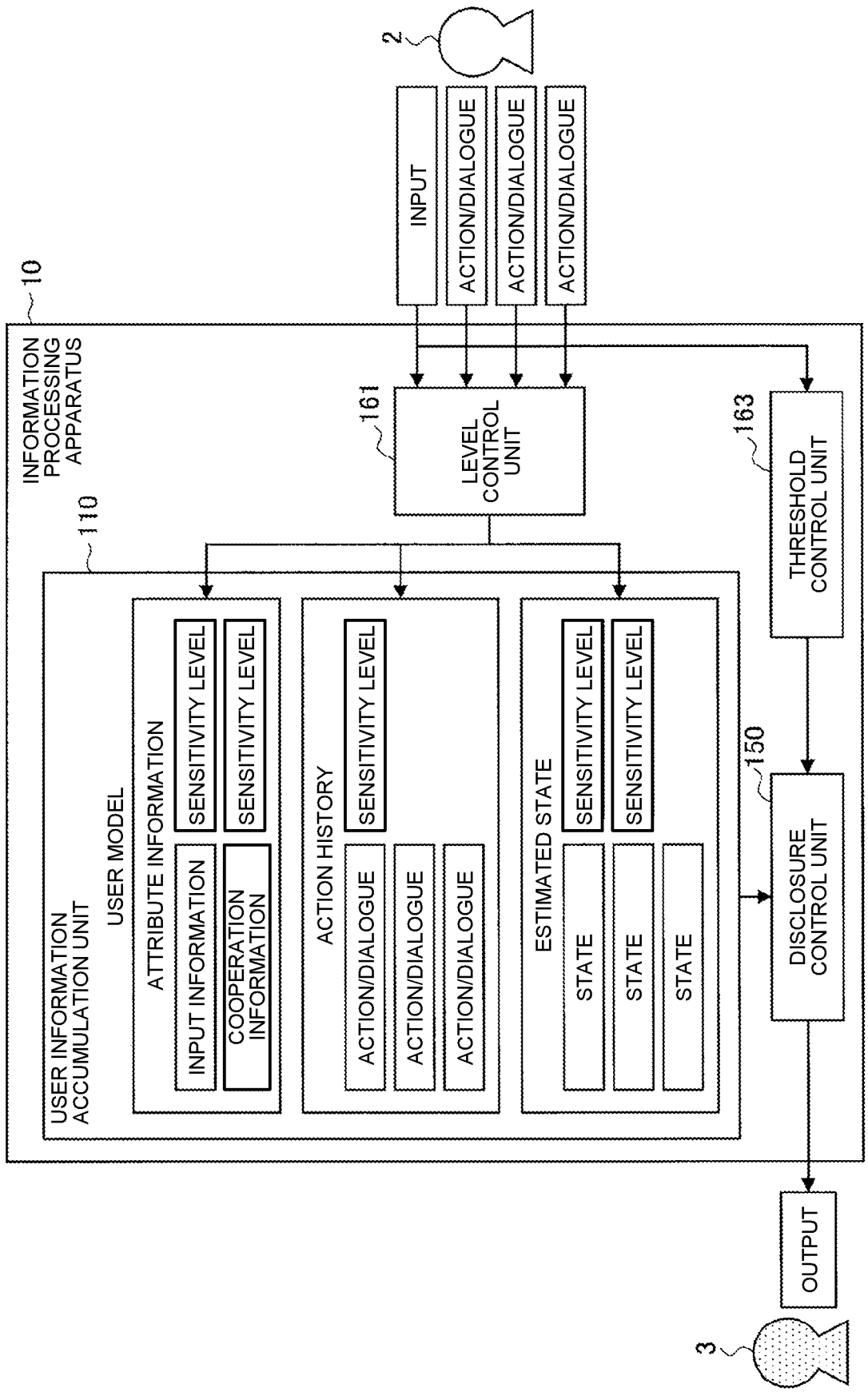
FIG. 8 is a block diagram illustrating a part extracted from functions of the information processing apparatus included in the information processing system according to a second modified example.

Next, a second modified example of the information processing system 1 according to the present embodiment will be described with reference to FIG. 8. FIG. 8 is a block diagram illustrating a part extracted from the functions of the information processing apparatus 10 included in the information processing system 1 according to the second modified example.

As illustrated in FIG. 8, in the second modified example, a level control unit 161 and a threshold control unit 163 are further included. The level control unit 161 controls the value of the sensitivity level set for each piece of information specified as corresponding to the sensitive information, and the threshold control unit 163 controls a threshold of the disclosed sensitivity level on the basis of the relationship between the user 2 and the third party 3. Note that the configuration other than the level control unit 161 and the threshold control unit 163 is as described with reference to FIG. 4, and thus the description thereof is omitted here.

The level control unit 161 controls the value of the sensitivity level of the information corresponding to the sensitive information accumulated in the user information accumulation unit 110 on the basis of the utterance or action of the user 2 or the characteristic of the user 2.

Specifically, the level control unit 161 may control the value of the sensitivity level of the information corresponding to the sensitive information on the basis of the personality characteristic of the user 2. For example, the level control unit 161 may control the value of the sensitivity level of the information corresponding to the sensitive information on the basis of personality characteristics such as BigFive or MBTI. For example, in a case where the user 2 is high in extraversion, it is expected that the user 2 tends to more actively construct a relationship with another person. In such a case, the level control unit 161 may control the value of the sensitivity level of the information corresponding to the sensitive information in such a manner that the information is easily disclosed. On the other hand, in a case where the user 2 is high in neuroticism, it is expected that the user 2 tends to be careful in disclosing the sensitive information. In such a case, the level control unit 161 may control the value of the sensitivity level of the information corresponding to the sensitive information in such a manner that the information is hardly disclosed. The personality characteristic of the user 2 can be estimated from, for example, the dialogue between the user 2 and the agent A, an action history of the user 2 on the Internet or SNS, or the like.

Furthermore, the level control unit 161 may control the value of the sensitivity level of the information corresponding to the sensitive information on the basis of the utterance or action of the user 2. For example, in a case where the user 2 himself/herself discloses the information corresponding to the sensitive information to a large number of third parties 3, the level control unit 161 may control the value of the sensitivity level set for the information in such a manner that the information is easily disclosed. Furthermore, the level control unit 161 may remove the specification of the information as corresponding to the sensitive information. Furthermore, in a case where the user 2 has not disclosed the information corresponding to the sensitive information to some of the third parties 3, the level control unit 161 may control the value of the sensitivity level set for the information in such a manner that the information is hardly disclosed. Furthermore, in a case where the user 2 has made an utterance with a content suggesting the confidentiality of the information corresponding to the sensitive information, the level control unit 161 may control the value of the sensitivity level set for the information in such a manner that the information is hardly disclosed.

Further, the level control unit 161 may change the sensitivity level set for the item of the information corresponding to the sensitive information among the items of information set in the sensitive information item database 140. That is, the level control unit 161 may control an initial value of the sensitivity level of the item of each piece of information set in the sensitive information item database 140. By doing so, the level control unit 161 can control the value of the sensitivity level set for the item of the information corresponding to the sensitive information to a value more optimized for the user 2.

The threshold control unit 163 controls a threshold of the sensitivity level at which the information corresponding to the sensitive information can be disclosed to the third party 3 on the basis of the relationship between the user 2 and the third party 3.

Specifically, the threshold control unit 163 may control the threshold of the sensitivity level at which the information corresponding to the sensitive information can be disclosed to the third party 3 on the basis of the degree of familiarity between the user 2 and the third party 3 determined from the dialogue between the user 2 and the third party 3. Furthermore, in a case where the relationship between the user 2 and the third party 3 that has been unknown has been revealed from the dialogue between the user 2 and the third party 3, the threshold control unit 163 may control the threshold of the sensitivity level at which the information corresponding to the sensitive information can be disclosed to the third party 3 on the basis of the revealed relationship between the user 2 and the third party 3.

Furthermore, the threshold control unit 163 may control the threshold of the sensitivity level at which the information corresponding to the sensitive information can be disclosed to the third party 3 on the basis of the degree of activation of information disclosure in the community to which the user 2 and the third party 3 belong. For example, in a case where the community to which the user 2 and the third party 3 belong is a community that actively discloses information, the threshold of the sensitivity level at which the information corresponding to the sensitive information can be disclosed to the third party 3 may be controlled in such a manner that the information is easily disclosed.

Note that the threshold control unit 163 can also control the threshold of the sensitivity level at which the information corresponding to the sensitive information can be disclosed to the third party 3, only for a specific third party 3 specified by the user 2. For example, the threshold control unit 163 may control the threshold of the sensitivity level at which the information corresponding to the sensitive information can be disclosed to a specific third party 3 (for example, a lover or the like) specified by the user 2 in such a manner that the information is easily disclosed. In addition, the threshold control unit 163 may control the threshold of the sensitivity level at which the information corresponding to the sensitive information can be disclosed to a specific third party 3 (for example, a third party or the like blocked by the user 2 on an SNS or the like) specified by the user 2 in such a manner that the information is hardly disclosed.

5. Hardware Configuration

Figure 9:
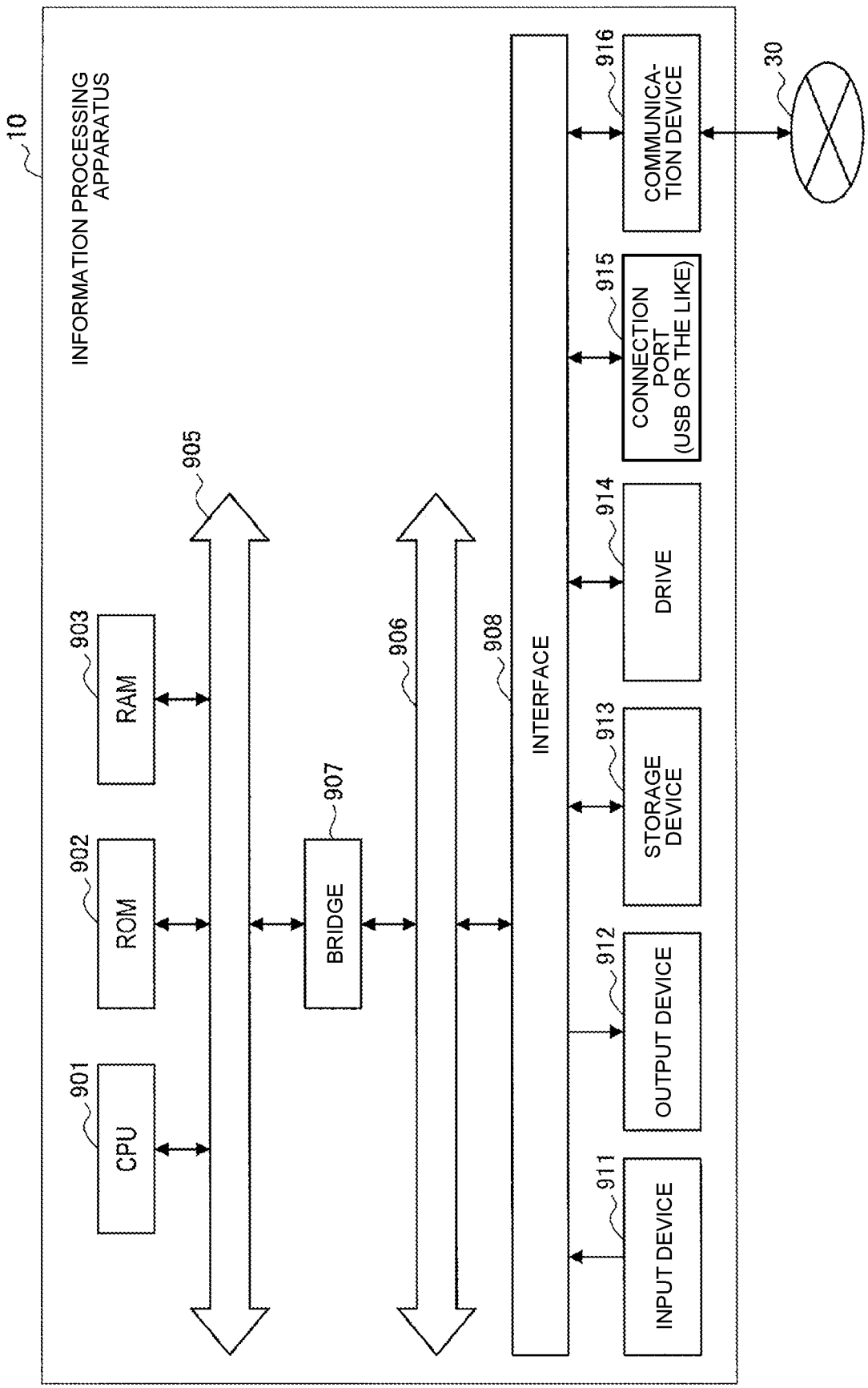
FIG. 9 is a block diagram illustrating an example of a hardware configuration in the information processing apparatus included in the information processing system according to the embodiment.

Next, an example of a hardware configuration of the information processing apparatus 10 included in the information processing system 1 according to the present embodiment will be described with reference to FIG. 9. FIG. 9 is a block diagram illustrating the example of the hardware configuration in the information processing apparatus 10 included in the information processing system 1 according to the present embodiment.

As illustrated in FIG. 9, the information processing apparatus 10 includes a central processing unit (CPU) 901, a read only memory (ROM) 902, a random access memory (RAM) 903, a host bus 905, a bridge 907, an external bus 906, an interface 908, an input device 911, an output device 912, a storage device 913, a drive 914, a connection port 915, and a communication device 916. The information processing apparatus 10 may include a processing circuit such as an electric circuit, a digital signal processor (DSP), or an application specific integrated circuit (ASIC) instead of the CPU 901 or together with the CPU 901.

The CPU 901 functions as an operation processing device or a control device, and controls an overall operation in the information processing apparatus 10 according to various programs. Furthermore, the CPU 901 may be a microprocessor. The ROM 902 stores a program, an operation parameter, and the like used by the CPU 901. The RAM 903 temporarily stores a program used in the execution of the CPU 901, a parameter that appropriately changes in the execution, and the like. For example, the CPU 901 may execute the functions of the state estimation unit 120, the specifying units 130 and 130A, the disclosure control unit 150, the level control unit 161, and the threshold control unit 163.

The CPU 901, the ROM 902, and the RAM 903 are mutually connected by the host bus 905 including a CPU bus and the like. The host bus 905 is connected to the external bus 906 such as a peripheral component interconnect/interface (PCI) bus via the bridge 907. Note that the host bus 905, the bridge 907, and the external bus 906 do not necessarily have to be separated, and these functions may be implemented by one bus.

The input device 911 is, for example, a device to which information is input by a user, such as a mouse, a keyboard, a touch panel, a button, a microphone, a switch, or a lever. Furthermore, the input device 911 may include, for example, an input control circuit that generates an input signal on the basis of the information input by the user by using the above input means.

The output device 912 is a device capable of visually or audibly notifying the user of information. The output device 912 may be, for example, a display device such as a cathode ray tube (CRT) display device, a liquid crystal display device, a plasma display device, an electro luminescence (EL) display device, a laser projector, a light emitting diode (LED) projector, or a lamp, or may be a sound output device such as a speaker or a headphone.

The output device 912 may output, for example, results obtained by various types of processing performed by the information processing apparatus 10. Specifically, the output device 912 may visually display the results obtained by various types of processing performed by the information processing apparatus 10 in various formats such as a text, image, table, or graph. Alternatively, the output device 912 may convert an audio signal such as voice data or acoustic data into an analog signal and audibly output the analog signal.

The storage device 913 is a data storage device configured as an example of the storage unit of the information processing apparatus 10. The storage device 913 may be implemented by, for example, a magnetic storage device such as a hard disk drive (HDD), a semiconductor storage device, an optical storage device, or a magneto-optical storage device. Examples of the storage device 913 may include a storage medium, a recording device that records data in a storage medium, a reading device that reads data from a storage medium, a deletion device that deletes data recorded in a storage medium, and the like. The storage device 913 stores a program executed by the CPU 901, various data, various data acquired from the outside, and the like. The storage device 913 may execute, for example, the functions of the user information accumulation unit 110 and the sensitive information item database 140.

The drive 914 is a reader/writer for a storage medium, and is built in or externally attached to the information processing apparatus 10. The drive 914 reads information recorded in a removable storage medium such as a mounted magnetic disk, optical disk, magneto-optical disk, or semiconductor memory, and outputs the information to the RAM 903. Furthermore, the drive 914 can also write information to a removable storage medium.

The connection port 915 is an interface connected to an external device. The connection port 915 is a connection port capable of transmitting data to an external device, and may be, for example, a universal serial bus (USB).

The communication device 916 is, for example, an interface configured by using a communication device or the like for connection to the network 30. The communication device 916 may be, for example, a communication card for wired or wireless local area network (LAN), long term evolution (LTE), Bluetooth (registered trademark), wireless USB (WUSB), or the like. Further, the communication device 916 may be a router for optical communication, a router for asymmetric digital subscriber line (ADSL), a modem for various types of communication, or the like. The communication device 916 can transmit and receive a signal and the like to and from, for example, the Internet or another communication device in accordance with a predetermined protocol such as TCP/IP.

Note that the network 30 is a wired or wireless information transmission path. For example, the network 30 may include a public line network such as the Internet, a telephone line network, or a satellite communication network, various local area networks (LAN) including Ethernet (registered trademark), a wide area network (WAN), or the like. In addition, the network 920 may include a dedicated line network such as an Internet protocol-virtual private network (IP-VPN).

Note that it is also possible to create a computer program for causing hardware such as a CPU, a ROM, and a RAM built in the information processing apparatus 10 to implement functions equivalent to the respective configurations of the information processing apparatus 10 included in the information processing system 1 according to the present embodiment described above. Furthermore, a storage medium storing the computer program can also be provided.

6. Supplementary Description

As described above, the preferred embodiments of the present disclosure have been described in detail with reference to the accompanying drawings, but the technical scope of the present disclosure is not limited to such examples. It will be apparent to those skilled in the art to which the present disclosure pertains that various modifications or alterations can be conceived within the scope of the technical idea described in the claims and it is naturally understood that these modifications or alterations fall within the technical scope of the present disclosure.

The agent A configured in the information processing system 1 according to the present embodiment can be used in various modes.

For example, in a case where the same user terminal 20 is shared by a plurality of users 2 or in a case where the same software agent is shared by a plurality of users 2, the information processing system 1 can prevent the sensitive information from being disclosed among the users 2. Furthermore, in a case where the agent A is shared by a plurality of users 2 belonging to a community such as a family, a friend group, a region, or a school, a community with the same hobby, or a community at a workplace, the information processing system 1 can prevent the sensitive information from being disclosed among the users 2.

Furthermore, the agent A configured in the information processing system 1 can be suitably used for, for example, business support in a workplace, watching or supervision of a remote user, schedule management, sharing of an action history, sharing of a daily necessity purchase history in a family or a workplace, and support of communication that may handle information corresponding to the sensitive information such as a message or chat, or an action report.

In such a case, for example, the agent A configured in the information processing system 1 can prevent information such as a destination from being disclosed between different departments in sharing car route guidance or the like. Furthermore, the agent A configured in the information processing system 1 can prevent a history of getting in a taxi or the like from being disclosed between different users 2. Furthermore, the agent A configured in the information processing system 1 can separately manage, in a car navigation system, a destination history to be displayed or contents (for example, a video and music) to be reproduced for each fellow passenger so as not to be mixed up in a case where fellow passengers are different.

Note that, in the above embodiment, a case where the sensitivity level is represented by a numerical value has been described as an example, but the present technology is not limited to such an example. For example, the sensitivity level may be represented by an information disclosure range such as "family", "friend", and "acquaintance", and may be represented by a character other than a numerical value such as "A", "B", or "C". The sensitivity level may be expressed in any expression as long as the disclosure range of the information corresponding to the sensitive information can be set in stages.

Furthermore, the effects described in the present specification are merely illustrative or exemplary and are not restrictive. That is, the technology according to the present disclosure can exhibit, in addition to or in place of the above-described effects, other effects obvious to those skilled in the art from the description of the present specification.

Note that the following configurations also fall within the technical scope of the present disclosure.

(1)

An information processing system comprising:
a user information accumulation unit that accumulates information regarding a user on a basis of an action of the user;
a specifying unit that specifies information corresponding to sensitive information among the accumulated information as corresponding to the sensitive information; and
a disclosure control unit that controls a disclosure mode of the information corresponding to the sensitive information in a case where the information corresponding to the sensitive information is disclosed to a third party other than the user.

(2)

The information processing system according to (1), wherein a sensitivity level indicating a level of sensitivity of the information is set for the information corresponding to the sensitive information, and
the disclosure control unit controls the disclosure mode of the information corresponding to the sensitive information on a basis of the sensitivity level.

(3)

The information processing system according to (2), wherein the disclosure control unit controls whether or not to disclose the information corresponding to the sensitive information to the third party on a basis of the sensitivity level.

(4)

The information processing system according to any one of (1) to (3), wherein the disclosure control unit controls the disclosure mode of the information corresponding to the sensitive information on a basis of a relationship between the user and the third party.

(5)

The information processing system according to (4), wherein the disclosure control unit controls the disclosure mode of the information corresponding to the sensitive information on a basis of at least one of a presence or absence of acquaintance, a degree of familiarity, or a degree of relatedness between the user and the third party.

(6)

The information processing system according to any one of (1) to (5), wherein in a case where the information corresponding to the sensitive information is disclosed to the user, the disclosure control unit controls the disclosure mode of the information corresponding to the sensitive information on a basis of a possibility of browsing by the third party.

(7)

The information processing system according to any one of (1) to (6), wherein the specifying unit specifies information of an item listed in a predetermined database among the accumulated information as corresponding to the sensitive information.

(8)

The information processing system according to (7), wherein a sensitivity level indicating a level of sensitivity of the information is set for each listed item in the predetermined database.

(9)

The information processing system according to (7) or (8), wherein the item listed in the predetermined database is controlled on a basis of a characteristic of the user.

(10)

The information processing system according to any one of (1) to (9), wherein in a case where a mode of the action of the user is a predetermined mode, the specifying unit specifies information accumulated on a basis of the action as corresponding to the sensitive information.

(11)

The information processing system according to any one of (1) to (10), wherein the specifying unit specifies information estimated to correspond to the sensitive information on a basis of the action of the user among the accumulated information as corresponding to the sensitive information.

(12)

The information processing system according to (2), further comprising a level control unit that further controls a value of the sensitivity level set for the information corresponding to the sensitive information.

(13)

The information processing system according to (12), wherein the level control unit controls the value of the sensitivity level set for the information corresponding to the sensitive information on a basis of the action of the user.

(14)

The information processing system according to (12) or (13), wherein the level control unit controls the value of the sensitivity level set for the information corresponding to the sensitive information on a basis of a characteristic of the user.

(15)

The information processing system according to (2), further comprising a threshold control unit that controls a threshold of the sensitivity level at which disclosure to the third party specified by the user is performed.

(16)

The information processing system according to any one of (1) to (15), wherein the information regarding the user accumulated in the user information accumulation unit includes information estimated on a basis of the action of the user.

(17)

The information processing system according to any one of (1) to (16), wherein the user information accumulation unit accumulates information for each user to construct a user model for each user.

(18)

The information processing system according to any one of (1) to (17), wherein the third party includes an external system that provides a service to the user.

(19)

An information processing method performed by an operation processing device, the information processing method comprising:

accumulating information regarding a user on a basis of an action of the user;

specifying information corresponding to sensitive information among the accumulated information as corresponding to the sensitive information; and controlling a disclosure mode of the information corresponding to the sensitive information in a case where the information corresponding to the sensitive information is disclosed to a third party other than the user.

(20)

A program causing a computer to function as:

a user information accumulation unit that accumulates information regarding a user on a basis of an action of the user;

a specifying unit that specifies information corresponding to sensitive information among the accumulated information as corresponding to the sensitive information; and a disclosure control unit that controls a disclosure mode of the information corresponding to the sensitive information in a case where the information corresponding to the sensitive information is disclosed to a third party other than the user.

REFERENCE SIGNS LIST

1 INFORMATION PROCESSING SYSTEM
2 USER
3 THIRD PARTY
5 EXTERNAL SERVICE
10 INFORMATION PROCESSING APPARATUS
20 USER TERMINAL
30 NETWORK
110 USER INFORMATION ACCUMULATION UNIT
120 STATE ESTIMATION UNIT
130, 130A SPECIFYING UNIT
140 SENSITIVE INFORMATION ITEM DATABASE
150 DISCLOSURE CONTROL UNIT
161 LEVEL CONTROL UNIT
163 THRESHOLD CONTROL UNIT

The invention claimed is:

1. An information processing system, comprising:
a central processing unit (CPU) configured to:
accumulate information regarding a user based on an action of the user;
specify first information corresponding to sensitive information among the accumulated information as corresponding to the sensitive information;
specify second information of an item listed in a specific database among the accumulated information as corresponding to the sensitive information, wherein a sensitivity level that indicates a level of sensitivity of the first information is set for the item listed in the specific database; and
control a disclosure mode of the first information corresponding to the sensitive information in a case where based on the first information corresponding to the sensitive information being disclosed to a third party other than the user.

2. The information processing system according to claim 1, wherein
the level of sensitivity is set for the first information corresponding to the sensitive information, and
the CPU is further configured to control the disclosure mode of the information corresponding to the sensitive information based on the sensitivity level.

3. The information processing system according to claim 2, wherein the CPU is further configured to control whether or not to disclose the first information corresponding to the sensitive information to the third party based on the sensitivity level.

4. The information processing system according to claim 2, wherein the CPU is further configured to control whether or not to disclose the first information corresponding to the sensitive information to the third party based on the sensitivity level.

5. The information processing system according to claim 4, wherein the CPU is further configured to control the disclosure mode of the first information corresponding to the sensitive information based on at least one of a presence or absence of acquaintance, a degree of familiarity, or a degree of relatedness between the user and the third party.

6. The information processing system according to claim 2, wherein the CPU is further configured to control a value of the sensitivity level set for the first information corresponding to the sensitive information.

7. The information processing system according to claim 6, wherein the CPU is further configured to control the value of the sensitivity level set for the first information corresponding to the sensitive information based on the action of the user.

8. The information processing system according to claim 6, wherein the CPU is further configured to control the value of the sensitivity level set for the first information corresponding to the sensitive information based on a characteristic of the user.

9. The information processing system according to claim 2, wherein the CPU is further configured to control a threshold of the sensitivity level at which disclosure to the third party specified by the user is performed.

10. The information processing system according to claim 1, wherein in a case where the first information corresponding to the sensitive information is disclosed to the user, the CPU is further configured to control the disclosure mode of the information corresponding to the sensitive information based on a possibility of browsing by the third party.

11. The information processing system according to claim 1, wherein the CPU is further configured to control the item listed in the specific database based on a characteristic of the user.

12. The information processing system according to claim 1, wherein in a case where a mode of the action of the user is a specific mode, the CPU is further configured to specify the accumulated information based on a basis of the action as corresponding to the sensitive information.

13. The information processing system according to claim 1, wherein the CPU is further configured to specify information estimated to correspond to the sensitive information based on the action of the user among the accumulated information as corresponding to the sensitive information.

14. The information processing system according to claim 1, wherein the information regarding the user accumulated in the user information accumulation unit includes information estimated based on the action of the user.

15. The information processing system according to claim 1, wherein the CPU is further configured to accumulate information for each user to construct a user model for each user.

16. The information processing system according to claim 1, wherein the third party includes an external system that provides a service to the user.

17. An information processing method, comprising:
in an operation processing device:
accumulating information regarding a user based on an action of the user;
specifying information corresponding to sensitive information among the accumulated information as corresponding to the sensitive information;
specifying second information of an item listed in a specific database among the accumulated information as corresponding to the sensitive information, wherein a sensitivity level that indicates a level of sensitivity of the first information is set for the item listed in the specific database; and
controlling a disclosure mode of the information corresponding to the sensitive information based on the information corresponding to the sensitive information being disclosed to a third party other than the user.

18. A non-transitory computer-readable medium having stored thereon, computer-executable instructions which, when executed by a computer, cause the computer to execute operations, the operations comprising:
accumulating information regarding a user based on an action of the user;
specifying information corresponding to sensitive information among the accumulated information as corresponding to the sensitive information;
specifying second information of an item listed in a specific database among the accumulated information as corresponding to the sensitive information, wherein a sensitivity level that indicates a level of sensitivity of the first information is set for the item listed in the specific database; and
controlling a disclosure mode of the information corresponding to the sensitive information based on the information corresponding to the sensitive information being disclosed to a third party other than the user.

* * * * *